(12) United States Patent
Arguelles et al.

(10) Patent No.: US 10,915,437 B1
(45) Date of Patent: Feb. 9, 2021

(54) FRAMEWORK FOR PERFORMING LOAD TESTING AND PROFILING OF SERVICES

(71) Applicant: Amazon Technologies, Inc., Seattle, WA (US)

(72) Inventors: Carlos Arguelles, Edmonds, WA (US); Priyanka Agha, San Mateo, CA (US); Fernando Ciciliati, London (GB); Tim Griffith, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/453,727

(22) Filed: Jun. 26, 2019

(51) Int. Cl.
*G06F 11/36* (2006.01)
*G06F 11/00* (2006.01)
*G06F 11/34* (2006.01)
*H04L 12/26* (2006.01)
*H04L 12/24* (2006.01)

(52) U.S. Cl.
CPC ...... *G06F 11/3688* (2013.01); *G06F 11/3664* (2013.01); *G06F 11/3676* (2013.01); *G06F 11/3684* (2013.01); *G06F 11/3692* (2013.01)

(58) Field of Classification Search
CPC ............ G06F 11/3414; G06F 11/3409; G06F 11/3452; G06F 11/3495; G06F 2201/875; G06F 11/3433; G06F 11/3688; G06F 11/3664; G06F 11/3676; G06F 11/3684; G06F 11/3692; G06F 2201/87; H04L 43/50
See application file for complete search history.

(56) References Cited

U.S. PATENT DOCUMENTS

| 10,108,520 | B2 * | 10/2018 | Kattepur | G06F 11/3433 |
|---|---|---|---|---|
| 10,198,348 | B2 * | 2/2019 | Buege | G06F 11/3006 |
| 10,474,563 | B1 * | 11/2019 | Rai | G06F 8/60 |
| 10,489,807 | B1 * | 11/2019 | Arguelles | G06F 11/3452 |
| 2003/0033406 | A1 * | 2/2003 | John | H04L 43/50 |
| | | | | 709/224 |

(Continued)

OTHER PUBLICATIONS

Ghaith et al., Profile-Based, Load-Independent Anomaly Detection and Analysis in Performance Regression Testing of Software Systems, 5 pages (Year: 2013).*

*Primary Examiner* — Thuy Dao
(74) *Attorney, Agent, or Firm* — Nicholson De Vos Webster & Elliott, LLP

(57) ABSTRACT

Techniques for performing load testing and profiling of services in a provider network are described. A load testing and profiling service is disclosed that analyzes profile data generated by a service and generates profile results associated with the service when the service operates at varying and/or increasing load capacities. The profile results are indicative of the performance of one or more functions performed by a service when the service operates at different load capacities. In certain embodiments, the load testing and profiling service can be invoked as part of a Continuous Deployment/Continuous Integration (CD/CI) environment that executes a load test against a test stack (e.g., test requests) before, for example, promoting code to production. For instance, the load testing and profiling service may be invoked as a step in a code deployment pipeline, e.g., for deploying a software product to a test environment, or to a production environment.

20 Claims, 9 Drawing Sheets

(56) References Cited

U.S. PATENT DOCUMENTS

| | | | | |
|---|---|---|---|---|
| 2015/0269496 A1* | 9/2015 | Arguelles | ............ | H04L 41/0886 |
| | | | | 706/12 |
| 2018/0004621 A1* | 1/2018 | Miwa | .................. | G06F 11/3419 |
| 2020/0036621 A1* | 1/2020 | Veeraraghavan | ....... | H04L 43/50 |
| 2020/0097390 A1* | 3/2020 | Gunter | .................. | G06F 11/368 |

\* cited by examiner

DETAILED PROFILE RESULTS FOR TEST PROFILE 1 FOR SERVICE A 502

| LINES OF CODE | FUNCTION(S) EXECUTED | DURATION OF FUNCTION CALLS | MEMORY USAGE |
|---|---|---|---|
| {Line 1, Line 2 ....Line N} | getSubscripAmt() | (START TIME, END TIME) | 124 KB |
| {Line 1, Line 2 ....Line N} | getInvoiceAmt() | (START TIME, END TIME) | 120 KB |
| {Line 1, Line 2 ....Line N} | getInvoiceDetail() | (START TIME, END TIME) | 300 KB |

PROFILE COMPARISON DATA 504

| PROFILE(S) | FUNCTION(S) EXECUTED | DURATION OF FUNCTION CALLS | PROFILE DATA PATTERN DIFFERENCE |
|---|---|---|---|
| (TEST PROFILE 1, TEST PROFILE 2) | getSubscripAmt() getInvoiceAmt() | (START TIME, END TIME) | BELOW THRESHOLD |
| (TEST PROFILE 1, TEST PROFILE 3) | getSubscripAmt() getInvoiceAmt() | (START TIME, END TIME) | AT THRESHOLD |
| (TEST PROFILE 2, TEST PROFILE 3) | getSubscripAmt() getInvoiceAmt() | (START TIME, END TIME) | ABOVE THRESHOLD |

*FIG. 5*

FRAMEWORK FOR PERFORMING LOAD TESTING AND PROFILING OF SERVICES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine is a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Service-oriented systems (also referred to herein as "service provider networks", or just "provider networks") comprise a variety of types of computing-related resources and/or services for executing a variety of tasks on behalf of a customer. Such tasks can include, for instance, executing code (e.g., an application/user function) on behalf of the customer, executing queries for the customer, and the like.

BRIEF DESCRIPTION OF DRAWINGS

Various embodiments in accordance with the present disclosure will be described with reference to the drawings, in which:

FIG. 5 is an exemplary illustration of profile results generated by the load testing and profiling service, according to some embodiments.

DETAILED DESCRIPTION

Figure 1:
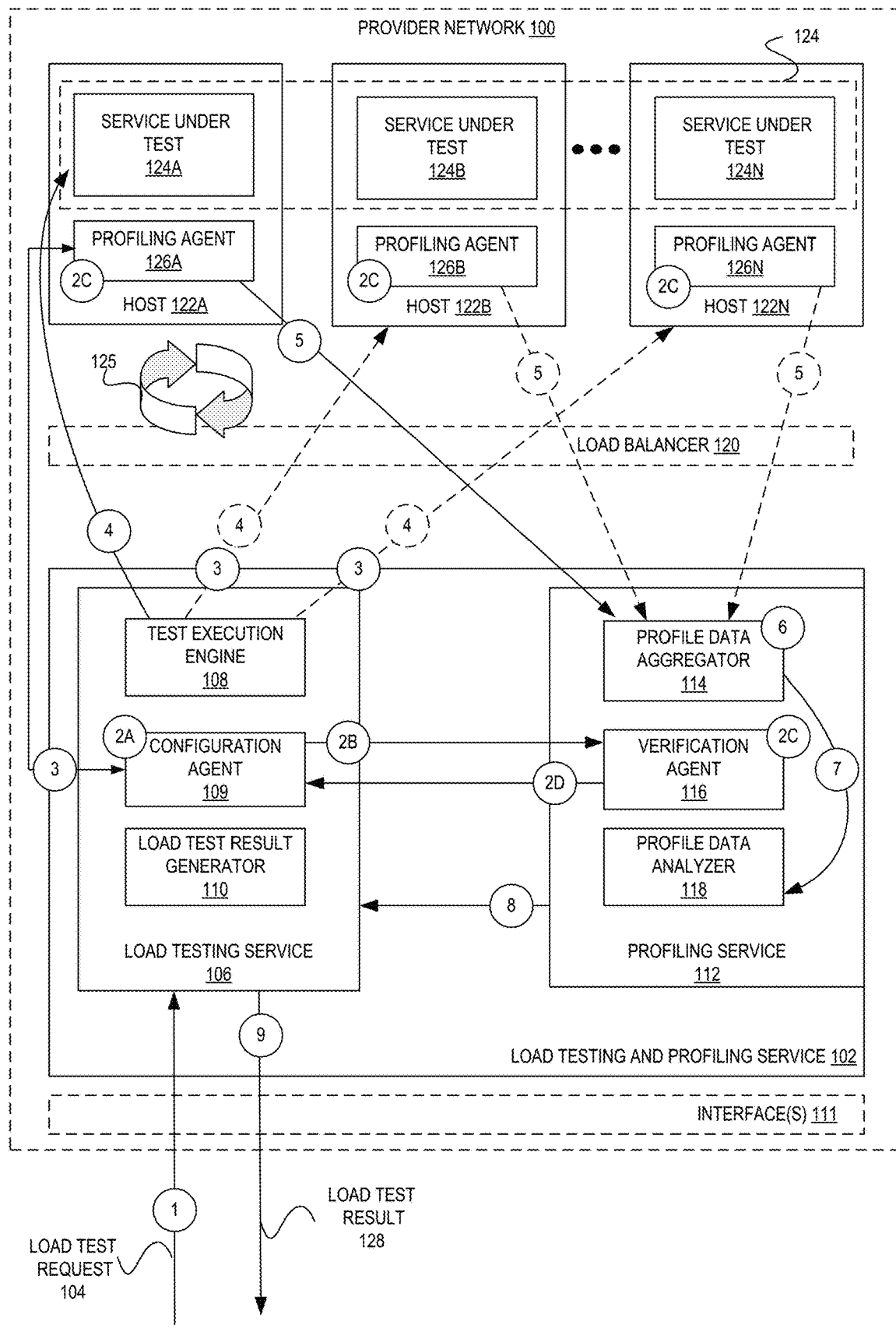
FIG. 1 is a diagram illustrating a framework for performing load testing and profiling of services provided by a provider network, according to some embodiments.

Various embodiments for a framework for load testing and profiling services in a provider network are described. According to some embodiments, a load testing and profiling service is disclosed that performs load testing and profiling of services. In certain embodiments, the load testing and profiling service analyzes profile data generated by a service and generates profile results associated with the service when the service operates at varying and/or increasing load capacities. The profile results are indicative of the performance of one or more functions performed by a service when the service operates at different load capacities. The load testing and profiling service can be invoked as part of a Continuous Deployment/Continuous Integration (CD/CI) environment that executes a load test against a test stack (e.g., test requests) before, for example, promoting code to production. For instance, the load testing and profiling service may be invoked as a step in a code deployment pipeline, e.g., for generating a build of a software product (service), deploying a software product to a test environment, or deploying a software product to a production environment.

Load testing generally refers to a process of sending requests or transactions ("load" or "demand") to a software application or service and observing responses (or other activity) generated by the system or service under test. Load testing is often performed to determine the response time of an application under both normal and anticipated peak load conditions. Load testing may also be performed to determine the maximum load an application or service can sustain before failing or before degrading beyond specified tolerances (e.g., tolerances for response latency). Existing load testing tools determine the maximum load (i.e., number of transactions) that a service can sustain before failing but may not be able to determine why a given load applied to the service caused a failure of the service. In other words, existing load testing tools generally do not have access to specific lines of code that are bottlenecking a service under test.

Profiling generally refers to a form of dynamic program analysis that measures the performance of functions performed by a service, over periods of time, to help service owners and/or service developers to identify expensive and/or time-consuming functions that are being called out by the service. Existing approaches to profiling typically involve profiling a service when the service operates at low load capacities (or throughput). However, this approach may not be suitable for service developers to identify functions that are most resource-demanding and/or those that impact application performance when the service operates at high load capacities. Performance bottlenecks and inefficient code can sometimes hide for years while services operate at low load capacities.

Embodiments of the disclosed load testing and profiling service enable service owners and/or service developers to perform profiling of services while services operate at increasing load capacities. In certain embodiments, the load testing and profiling service generates test profiles and profile results indicative of the performance of one or more functions performed by a service when the service operates at different and/or increasing load capacities. In certain embodiments, the load testing and profiling service generates a performance report for the service comprising information related to the number of successful transactions processed by the service at different load capacities and information related to the performance of one or more functions of the service at the different load capacities. For example, the load testing and profiling service may identify, from a test profile, specific lines of code (or more generally, operations and/or functions performed by a service) where the service is spending a considerable amount of time when the service operates at a particular load capacity and provide this information as profile results to users of the provider network. In other examples, the load testing and profiling service may identify, from a load test result, a significant difference in profile data in a test profile generated from a previous version of a build of a software product (e.g., a service) to a test profile generated based on a second version of the build of the software product and provide this information as profile results to users of the provider network. Users may utilize this information to determine whether a new version of the software product can be deployed to a test or production environment, or simply determine that a version of the application has a performance issue and/or identify portions of the application that need further refactoring or development.

FIG. 1 is a diagram illustrating a framework for performing load testing and profiling of services provided by a provider network, according to some embodiments. In certain embodiments, a load testing and profiling service 102 is disclosed that provides a framework for load testing and profiling of services. In FIG. 1, the load testing and profiling service 102 is shown as part of a provider network, though in other embodiments the load testing and profiling service 102 may be implemented outside of a provider network, such as within a private or "on premise" network environment of an organization.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

In certain embodiments, the load testing and profiling service 102 comprises a load testing service 106 and a profiling service 112. The load testing service 106 may include various components, modules, or functionalities such as a test execution engine 108, a configuration agent 109, and a load test result generator 110. These components may be implemented in hardware, software or a combination of both and collectively used by the load testing service 106 to perform load testing of one or more services 124A-124N executing on hosts 122A-122N. In certain embodiments, the load testing service 106 and its components may be part of a testing framework that is available to developers of services for performing load testing of services. For instance, as described in relation to FIG. 2, the load testing service 106 may be initiated or invoked by a developer of a service to perform load testing of services. In other embodiments, the load testing service 106 may be activated automatically, e.g., without a need for user initiation or user intervention after an initial configuration stage, or programmatically, e.g., by execution of program instructions on a computing device. For instance, the load testing service 106 may be activated as part of a deployment pipeline for testing a service at build time, deployment time, or any other suitable time in the development cycle as described in relation to FIG. 3.

The services 124A-124N described herein may include but are not limited to one or more of network-based services (e.g., a web service), applications, functions, objects, methods (e.g., objected-oriented methods), subroutines, or any other set of computer-executable instructions. In various embodiments, such services may communicate through Representational State Transfer (REST) Application Programming Interfaces (APIs) (e.g., sent using Hypertext Transfer Protocol (HTTP)), or any of a variety of other communication protocols and techniques such as Remote Procedure Calls (RPC), Simple Object Access Protocol (SOAP), and the like. In various embodiments, data passed between services using these communication techniques may be represented using one or more data interchange formats such as JavaScript Object Notation (JSON), Extensible Markup Language (XML), YAML Aint Markup Language (YAML), or another markup language or format. In various embodiments, descriptions of operations offered by one or more of the services may include Web Service Description Language (WSDL) documents, which may in some cases be provided by a service developer accessible to the services and its components. For example, if a software product implements a service that is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc.

The load testing and profiling service 102 may include (or utilize) multiple hosts 122A-122N which may be implemented by one or more computing devices. In some embodiments, the hosts may execute the one or more services 124A-124N. The services may represent different services (e.g., different sets of program code) or different instances of the same service which may or may not communicate with each other (e.g., through message passing) to carry out various tasks. In certain examples, a service may be implemented using multiple copies of a same instance that are load balanced between each other. Such instances may operate independently and may or may not communicate with each other. The hosts may be located in any suitable number of data centers or geographical locations. In one embodiment, multiple services and/or instances of the same service may be executed using the same host.

In certain embodiments, the load testing service 106 performs load testing of service(s) 124A-124N executed by the host(s) 122A-122N. The load testing service 106 may execute load tests on a single host, in some examples, or may execute load tests on a set of hosts, in other examples. In certain embodiments, and as will be discussed in greater detail below, the load testing service 106 may execute the load tests in a test environment in which a service under test (e.g., 124A) may be insulated from real-time interaction with real-world clients, e.g., by processing only synthetic requests or pre-recorded client requests that were previously captured in a production environment.

In certain embodiments, the profiling service 112 may include various components, modules, or functionalities such as a profile data aggregator 114, a verification agent 116, and a profile data analyzer 118. These components may be implemented in hardware, software or a combination of both and collectively used by the profiling service 112 to perform profiling of services executing on hosts 122A-122N. As described herein, "profiling" is a form of dynamic program analysis by which service owners (service developers) can identify factors that potentially affect the performance of a service. These factors may include, for instance, lines of code represented by the services where services are spending a considerable amount of time, non-scaling code, dominating service calls, frequency and duration of function calls represented by the service, expensive functions that are being called out by services, and the like. In certain embodiments, the profiling service 112 simultaneously performs the profiling of services while the service operates at different load amounts to identify stress points (breaking points) in the service's performance in a test execution environment. In some examples, the profile service 112 performs the profiling of services by identifying lines of code that are most resource-demanding and that impact the service's performance when the service operates at different load amounts. The operations performed by the profiling service 112 are discussed in greater detail below.

As shown at (1), a request 104 may be received to perform load testing for one or more services 124A-124N in the provider network. The request may be received by the load testing service 106 using any suitable interface(s) 111. In certain embodiments, the request may be sent by an owner and/or developer of the service as described in FIG. 2. In other embodiments, the request may be issued as a step in a pipeline, e.g., for generating a build of a software product (service), deploying a software product to a test environment, or deploying a software product to a production environment as described in FIG. 3. In certain embodiments, the request 104 may specify one or more configuration parameters that specify load steps to be applied to the service(s) under test 124A-124N. For instance, the configuration parameters may specify a service identifier of the service(s) under test, a specific endpoint or host on which the service(s) execute, a load amount such as a number of transactions per second (TPS) to be executed by the load test, a time period of the load test (e.g., a running time window which specifies the start time and end time of the load test), a desired sampling interval for the load test, and so on.

At (2A), the request 104 may be received by a configuration agent 109 in the load testing service 106. In certain embodiments, at (2A), the configuration agent 109 may determine if the identified service(s) specified in the load test request 104 are available for load testing. Additionally, the configuration agent 109 may verify if the identified service(s) can achieve the desired throughput (e.g., load amount in TPS) goal specified by the load test request 104. For instance, the configuration agent 109 may perform the verification by comparing if the desired load amount specified in the request 104 is below or at a maximum load amount acceptable to the identified service(s) for load testing purposes.

At (2B), the configuration agent 109 may establish communication with the profiling service 112 to enable, verify, or configure the profiling of the identified service(s) during the load test. In certain embodiments, the configuration agent 109 may establish communication by initiating a handshake process with the profiling service 112. As part of the handshake process, the configuration agent 109 at (2B) may transmit, via a message to the profiling service 112, an indicator indicating that load testing of the service(s) will be performed. The configuration agent 109 may also transmit one or more configuration parameters to the profiling service 112. As noted above, the configuration parameters may include service identifiers of the service(s) under test, a specific endpoint or host on which the service(s) execute, the number of transactions per second (TPS) to be executed by the load test, a time period of the load test (e.g., a running time window which specifies the start time and end time of the load test), a sampling interval of the load test, a desired reporting time interval (e.g., 5 minutes) at which the profile results should be reported back to the load testing service and so on.

In certain embodiments, at (2C) upon receiving the message from the configuration agent 109, a verification agent 116 in the profiling service 112 may verify that it is indeed able to perform profiling of the identified service(s). The verification by the verification agent 116 may include, for instance, communicating to the profiling agents 126A-126N attached to the hosts to verify that profiling for the identified service(s) has been enabled and that profiling data can be gathered for the duration of the load test. In some examples, the verification at (2C) may involve re-configuring the profiling agents 126A-126N to increase or change a sampling interval at which the hosts transmit their sampled transactions (e.g., client requests) to the profiling service. In certain instances, the verification at (2C) may involve determining if the running time window (e.g., a window of time between the specified start time and end time) of the load test is aligned with an aggregation time window determined by the profiling service 112. An aggregation time window may be utilized in some embodiments by the profiling service 112 to perform profiling of services at a desired granularity (e.g., at five-minute intervals). In certain embodiments, the load testing service 106 may adjust its start time to align itself with a beginning of an aggregation window specified by the profiling service 112. For instance, if a load test request arrives at 8:12 AM and the beginning of the next aggregation window specified by the profiling service is at 8:15 AM, the load testing service 106 can wait until 8:15 to align itself to the beginning of the aggregation window and then initiate the load test. The alignment of the running time window of the load test with the aggregation time window of the profiling service ensures that noise in the form of transactions (requests) coming from sources other than the load testing service 106 that may affect the load test results are reduced or eliminated. In certain embodiments, as part of the operations performed at (2C), the profiling service 112 may determine an interval schedule by which it can align itself to a reporting time interval specified by the load testing service. In other examples, the profiling service 112 may itself align to a reporting time interval based on its aggregation window. For instance, the profiling service 112 may aggregate its profile results at 5-minute intervals (based on its aggregation window) and report its results back to the load testing service 106 at the end of each aggregation window.

In certain embodiments, at (2D), the verification agent 116 may provide a response back to the configuration agent 109 in the load testing service 106 indicating that profiling has been successfully verified, configured, or enabled for the identified service(s) and that profiling will be performed for the identified service(s) for the duration of the test. Alternatively, if profiling cannot be verified, configured, or enabled for the identified service(s) and/or if the identified service(s) cannot be profiled, the verification agent 116 may send a response back to the configuration agent 109 indicating failure of profiling of the identified service(s), which may cause the load testing service 106 to abort the load test.

At (3), the load testing service 106 may send a notification message to the host(s) 122A-122N prior to initiating a load test on the identified service(s) 124A-124N. In certain embodiments, the notification message may be sent to one or more profiling agents 126A-126N executed by the hosts. The notification message may include information related to the desired sampling interval at which client requests should be sampled by the host(s), the desired throughput goal (e.g., in a number of TPS) to be achieved by the host(s), a time interval at which the hosts should transmit their sampled transactions (e.g., client requests) to the profiling service 112, etc. In certain embodiments, in response to receiving the notification message, the profiling agents 126A-126N may send an acknowledgement message back to the load testing service 106, which may indicate that they are ready for the load test and optionally may indicate that they have increased their sampling interval to achieve the desired throughput goal specified by the load testing service, etc.

At (4), the load testing service 106 may perform (execute) a load test on the identified service(s) by transmitting test request data (e.g., client requests), optionally via a load balancer 120 to the host(s) at the desired throughput capacity (e.g., in TPS) specified as part of the load test request. In certain embodiments, a test execution agent 108 in the load testing service 106 may be configured to simulate the client requests by generating synthetic test data (e.g., choosing random strings or numbers in valid ranges, etc.) or by replaying real-world traffic that service owners have saved in past runs. For example, client request data may be captured and stored in a data store (not shown in FIG. 1) for subsequent use in testing of service(s) as test request data. Thus, the test request data may correspond to actual client requests that are captured and stored by the test execution engine 108 for testing the service(s) or may correspond to synthetic requests generated by the test execution engine for the purpose of testing services. Examples of client request data may include, for instance, web page requests, transactions, posts, or other types of requests sent to the services.

At (5), the profiling agent(s) 126A-126N executed by the host(s) may process the transactions (e.g., client requests) at the desired throughput goal (e.g., in TPS) and obtain profile data generated as a result of execution of the load test. The profile data may comprise snapshots of information referencing code executed by the running service(s) under test 124A-124N. For instance, the profile data may comprise data related to program characteristics (e.g., memory usage, lines of code, duration of function calls, exact time of the function calls) of the identified service(s) under test.

In certain embodiments, a request to perform load testing for a service may specify a target load to be executed by the load test in a set of load steps. The set of load steps may include, for instance, a first load step associated with a first load amount and a first period of time and a second load step associated with a second load amount and a second period of time. The load amount may be specified in terms of a transaction frequency (e.g., in TPS) or in terms of a number of concurrent transactions etc. As an example, as shown in FIG. 1, the operations of initiating a load test on the identified service(s) 124A-124N at circle (3), executing a load test on the identified service(s) at circle (4), and obtaining profile data generated as a result of execution of the load test at circle (5) may be performed once as part of a single load step 125 during the execution of the load test or may be performed multiple times for each load step of a load test, where each load step includes a different load amount and a different time period.

At (6), a profile data aggregator 114 in the profiling service 112 may aggregate the profile data received from the profiling agent(s) 126A-126N over an aggregation time window (e.g., 5-minute intervals) specified by the profiling service 112 to generate one or more test profiles.

At (7), the profile data aggregator 114 may transmit the test profiles to the profile data analyzer 118. In certain embodiments, the profile data analyzer 118 may analyze the test profiles to identify bottlenecks and/or performance anti-patterns in the profile data and generate profile results based on the analysis. The profile data analyzer 118 may assign each anti-pattern with a confidence level and transmit this information as part of profile results (at (8)) to the load testing service 106. In certain embodiments, the analysis may include identifying, from the one or more test profiles, specific lines of code (or other portions of code, such as files, functions or methods, libraries, service calls, etc.) that are creating bottlenecks in the service(s) 124A-124N under test. In some examples, the analysis may include, identifying, from the one or more test profiles, the duration of the function calls, non-scaling code, dominating service calls, the frequency and duration of function calls, that are being called out by the service(s) under test, etc. In certain embodiments, the profile data analyzer 118 may compare the test profiles generated by a first load test executed at a first throughput goal (i.e., a first number of TPS) or a first load amount with the test profiles generated by a second load test executed at a second throughput goal (i.e., a second number of TPS) or a second load amount to identify portions of code (e.g., a core function/method that has increased in execution time significantly) that behave differently at different throughputs (or load amounts).

At (8), the profiling service 112 may transmit the profile results to the load testing service 106. The load testing service 106 may generate a load test result based on the profile results as well as direct results of the load test implemented by the test execution engine 108, such as indications of when particular types or numbers of requests were issued, what types and/or numbers of responses were returned from the service for these requests, how long particular requests took to process, etc. In certain embodiments, the load test result may include the profile results and a number of successful transactions processed by the service under test over a period of time along with any other suitable throughput metrics. For example, the throughput metrics may relate to aspects of processor usage, memory usage, disk or storage usage, network usage, and/or the usage of any other measurable resource. In certain examples, a load test result may be associated with an acceptable range of results, and results outside the acceptable range may constitute a failure for that particular test.

In certain embodiments, various heuristics may be applied to determine whether the service passes or fails a particular load test. The heuristics may also include default heuristics, where appropriate. In some embodiments, a user may specify (as part of the load test request) the percentile metrics to consider for the heuristics (e.g., minimum, maximum, average, etc.). In some embodiments, a user may specify which transactions to consider for the heuristics: e.g., all transactions averaged, any transaction type, or a specific transaction type. In some embodiments, the heuristics may implement service level agreements (SLAs) for the service. For example, the performance metrics collected for the tests may indicate the number of transactions processed and the pass/fail ratio. A heuristic may fail a build if the error rate exceeds a predetermined threshold (e.g., 0.1% error rate). Such a heuristic may be applied to one or more specific transaction types or to all transaction types.

At (9), the load testing service 106 may report the results of the combined load testing and profiling to one or more suitable entities as a load test result 128, such as an owner of the service under test or to the load testing and profiling service 102. In some embodiments, the load testing service 106 may generate a performance report that is part of the load test result. The load test result may be caused to be displayed to the user via the electronic device 203. Examples of performance reports generated by the load testing service 106 are described in relation to FIG. 4 and FIG. 5. In certain embodiments, upon completion of the load test, the load testing service 106 may send a notification message back to the hosts 122A-122N that testing has ended so that the hosts can resume their normal sampling intervals.

Figure 2:
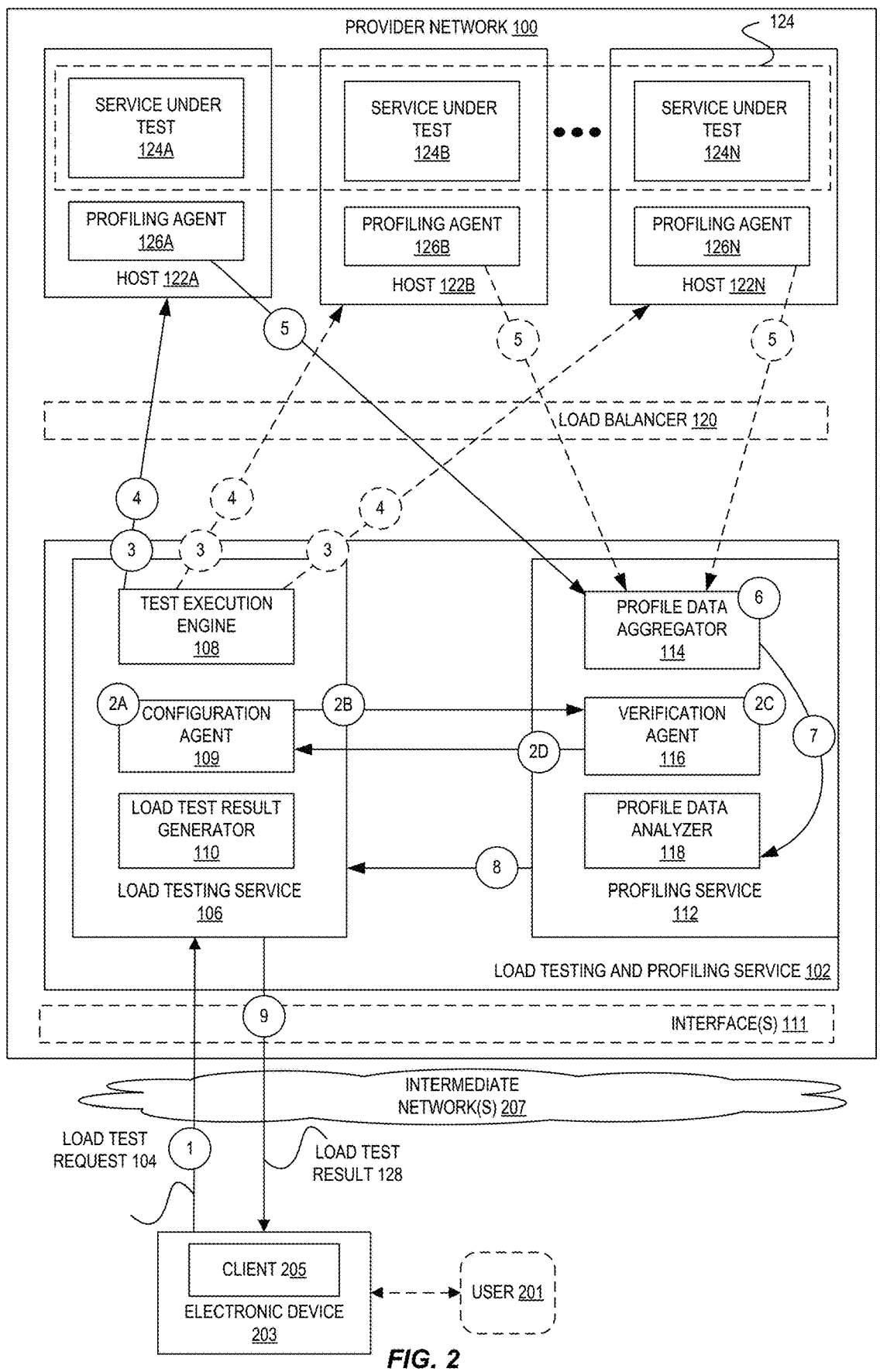
FIG. 2 is a diagram illustrating a framework for performing load testing and profiling of services provided by a provider network, according to another embodiment of the present disclosure.

FIG. 2 is a diagram illustrating a framework for performing load testing and profiling of services provided by a provider network, according to another embodiment of the present disclosure. In certain embodiments, the load testing service 106 may be initiated or invoked by a developer of a service to perform load testing of services. For instance, a user 201 (e.g., a service owner or service developer) may interact with the provider network 100 across one or more intermediate networks 207 (e.g., the internal via one or more interface(s) 111, such as through use of application programming interface (API) calls, via a console implemented as a website or application, etc. As noted above, the interface(s) may be part of, or serve as a front-end to, a control plane of the provider network 100 that includes "backend" services supporting and enabling the services that may be more directly offered to customers.

As shown at (1), a load test request 104 may be caused to be issued (via a client 205) by a user 201 to perform load testing for one or more services 124A-124N in the provider network. The request may be received by a load testing service 106 using any suitable interface(s) 111. The operations (2A)-(9) are similar in nature to the operations described in relation to FIG. 1. For instance, at (2A), the configuration agent 109 may determine if the identified service(s) specified in the load test request 104 are available for load testing. At (2B), the configuration agent 109 may establish communication with the profiling service 112 to enable, verify or configure the profiling of the identified service(s) during the load test. At (2C), profiling service 112 may verify that profiling for the identified service(s) has been enabled, verified or configured and that profiling data can be gathered for the duration of the load test. As noted above, the verification at (2C) may involve determining if the running time window (start time, end time) of the load test is aligned with an aggregation time window determined by the profiling service 112.

At (3) load testing service 106 may notify the profiling agents 126A-126N attached to the hosts 122A-122N that a load test will be initiated. For instance, as part of the notification, the load testing service 106 may transmit to the profiling agents, information related to the desired sampling interval at which client requests should be sampled by the host(s), the desired throughput goal (in the number of TPS) to be achieved by the host(s) and a time interval at which the hosts should transmit their sampled transactions (client requests) to the profiling service 112.

At (4), the load testing service 106 may perform (execute) a load test on the identified service(s) by transmitting test request data (e.g., client requests) via a load balancer 120 to the host(s) at the desired throughput capacity (in TPS) specified as part of the load test request.

At (5), the profiling agent(s) attached to the host(s) may process the transactions (client requests) at the desired throughput goal (in TPS) and obtain profile data generated as a result of execution of the load test. At (6), a profile data aggregator 114 in the profiling service 112 may aggregate the profile data received from the profiling agent(s) 126A-126N over an aggregation time window (e.g., 5 min intervals) specified by the profiling service 112 to generate one or more test profiles.

At (7), the profile data aggregator 114 may transmit the test profiles to the profile data analyzer 118. As noted above, the profile data analyzer 118 may analyze the test profiles to identify bottlenecks and/or performance anti-patterns in the profile data and generate profile results based on the analysis. In some examples, the profile data analyzer 118 may identify, from the test profiles, specific lines of code that are creating bottlenecks in the service(s) (e.g., 124A-124N) under test. At (8), the profiling service 112 may transmit the profile results to the load testing service 106. At (9), the load testing service 106 may report the results of the load testing to a client 105 executed by an electronic device 203 of the user 201 (who may be an owner of the service under test). In some embodiments, and as noted above, the load testing service 106 may generate a performance report that is part of the load test result. The load test result may be caused to be displayed to the user via the electronic device 203. Examples of performance reports generated by the load testing service 106 are described in relation to FIG. 4 and FIG. 5.

Figure 3:
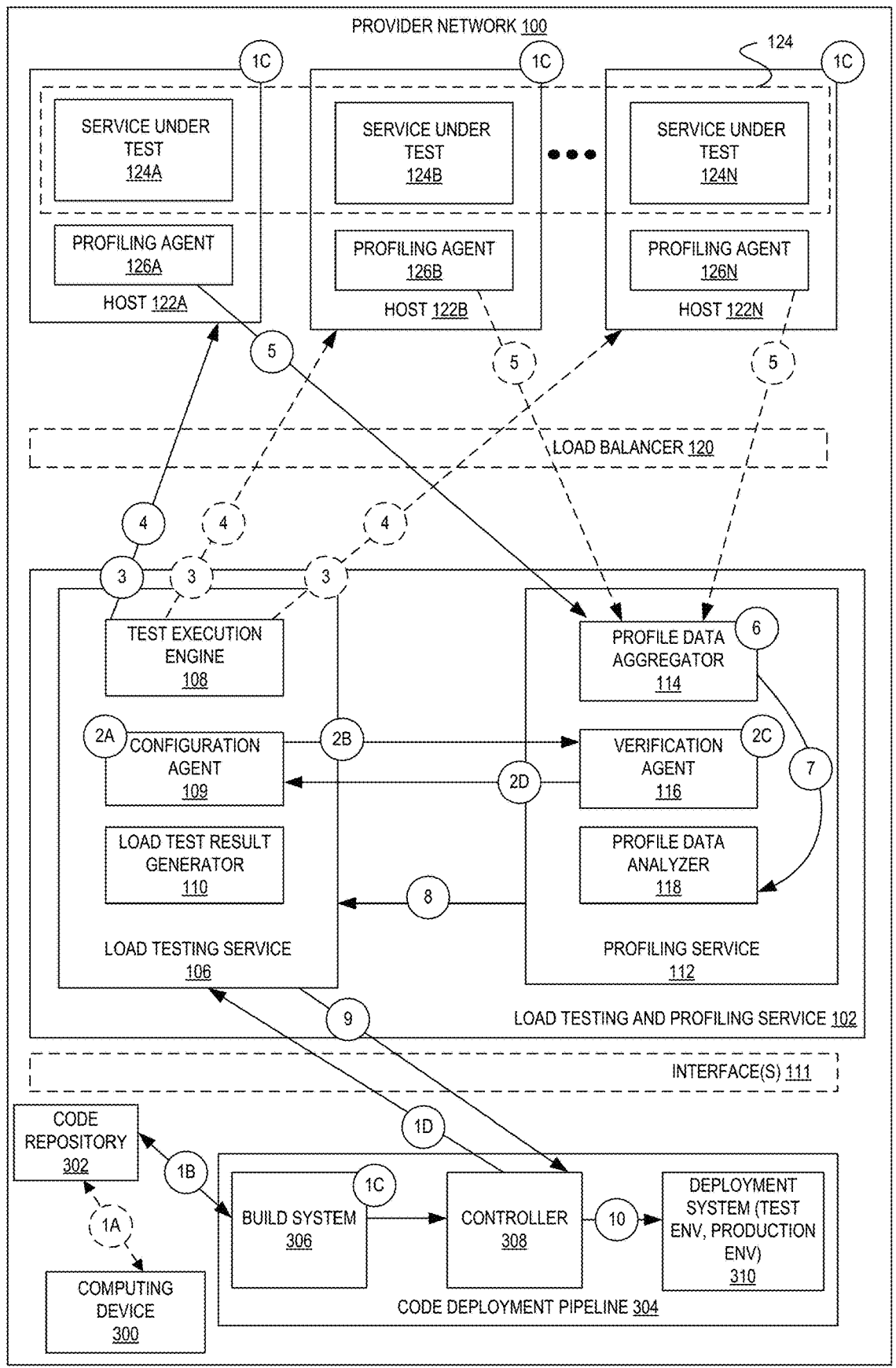
FIG. 3 is a diagram illustrating a framework for performing load testing and profiling of services provided by a provider network, according to another embodiment of the present disclosure.

FIG. 3 is a diagram illustrating a framework for performing load testing and profiling of services provided by a provider network, according to another embodiment of the present disclosure. In certain embodiments, the load testing service 106 may be invoked as part of a CD/CI environment that executes a load test against a test stack before, for example, promoting code to production. As shown in FIG. 3, the load testing service 106 may be invoked as a step in a code deployment pipeline 304, e.g., for generating a build of a software product (service), deploying a software product to a test environment, or deploying a software product to a production environment. In FIG. 1, code deployment pipeline 304 is shown as part of a provider network, though in other embodiments the code deployment pipeline 304 may be implemented outside of a provider network, such as within a private or on-premise network environment of an organization. The code deployment pipeline 304 may include various components, modules, or functionalities such as a build system 306, a controller 308, and a deployment system 310. These components may be implemented in hardware, software or a combination of both and collectively used by the code deployment pipeline 304 for the purposes of testing and deploying a software product to a test and/or a production environment.

As shown, at (1A), a user via a computing device 300 may submit code representing operations performed by one or more service(s) 124A-124N to a code repository 302. As noted above, the service(s) may include software products, applications, functions, objects, methods (e.g., objected-oriented methods), subroutines, or any other set of computer-executable instructions. For instance, if a software product implements a service that is associated with an electronic commerce (e-commerce) merchant, then the service may be configured to perform one or more suitable operations such as generating a web page (e.g., a product description page for a product offered for sale by the merchant), completing a sale or other transaction between the merchant and a customer, verifying a payment presented by the customer, etc.

At (1B), a build system 306 may obtain the code from the code repository 302 to generate a build (i.e., a version of the program code) for the service. For instance, the build system 306 may pass the code through a compiler (not shown in FIG. 3) which may translate high-level language instructions (i.e., source code) into object code to generate the build for the service. In certain embodiments, at (1C), the build system 306 may push the build to a testing environment by transmitting the build to the hosts 122A-122N executing the services 124A-124N. As one example, the build system 306 may setup the test environment using a deployment system 310 of the code deployment pipeline 304, which can obtain the build and setup and configure the test environment appropriately. At (1D), the controller 308 may submit a load test request to the load testing service 106 which then initiates a load test to test the build generated for the service. The load testing service 106 may then perform operations to perform load testing and profiling of the service. The operations performed at (2A)-(9) are similar in nature to the operations described in relation to FIG. 1.

For instance, at (2A), the configuration agent 109 may determine if the identified service(s) specified in the load test request 104 are available for load testing. At (2B), the configuration agent 109 may establish communication with the profiling service 112 to enable, verify, or configure profiling of the identified service(s) during the load test. At (2C), profiling service 112 may verify that profiling for the identified service(s) has been enabled, verified, or configured and that profile data can be gathered for the duration of the load test. As noted above, the verification at (2C) may involve determining if the running time window (start time, end time) of the load test is aligned with an aggregation time window determined by the profiling service 112.

At (3) load testing service 106 may notify the profiling agents 126A-126N attached to the hosts 122A-122N that a load test will be initiated. For instance, as part of the notification, the load testing service 106 may transmit to the profiling agents, information related to the desired sampling interval at which client requests should be sampled by the host(s), the desired throughput goal (in the number of TPS) to be achieved by the host(s) and a time interval at which the hosts should transmit their sampled transactions (client requests) to the profiling service 112.

At (4), the load testing service 106 may perform (execute) a load test on the identified service(s) by transmitting test request data (e.g., client requests) via a load balancer 120 to the host(s) at the desired throughput capacity (in TPS) specified as part of the load test request.

At (5), the profiling agent(s) attached to the host(s) may process the transactions (client requests) at the desired throughput goal (in TPS) and obtain profile data generated as a result of execution of the load test. At (6), a profile data aggregator 114 in the profiling service 112 may aggregate the profile data received from the profiling agent(s) 126A-126N over an aggregation time window (e.g., 5 min intervals) specified by the profiling service 112 to generate one or more test profiles.

At (7), the profile data aggregator 114 may transmit the test profiles to the profile data analyzer 118. As noted above, the profile data analyzer 118 may analyze the test profiles to identify bottlenecks and/or performance anti-patterns in the profile data and generate profile results based on the analysis. In some examples, the profile data analyzer 118 may identify, from the test profiles, specific lines of code that are creating bottlenecks in the service(s) (e.g., 124A-124N) under test. At (8), the profiling service 112 may transmit the profile results to the load testing service 106.

At (9), the load testing service 106 may report a load test result (e.g., comprising a performance report) to the controller 308. In certain embodiments, at (9), the controller 308 may analyze the load test result determine whether to pass or fail the build. For instance, the controller 308 may determine, from the load test result, a significant difference in profile data in a test profile generated based on a first/previous version of the build of the software product (service) to a test profile generated based on a second version of the build of the software product and determine whether to pass or fail the build based on this information. Or, for example, the controller 308 may determine, from the load test result, that the anti-patterns identified in the profile data are above a certain threshold and determine whether to pass or fail the build based on this information. At (10), if the controller 308 determines that the load test was successful, it causes the deployment system 310 to deploy the build of the service to a production environment.

Figure 4:
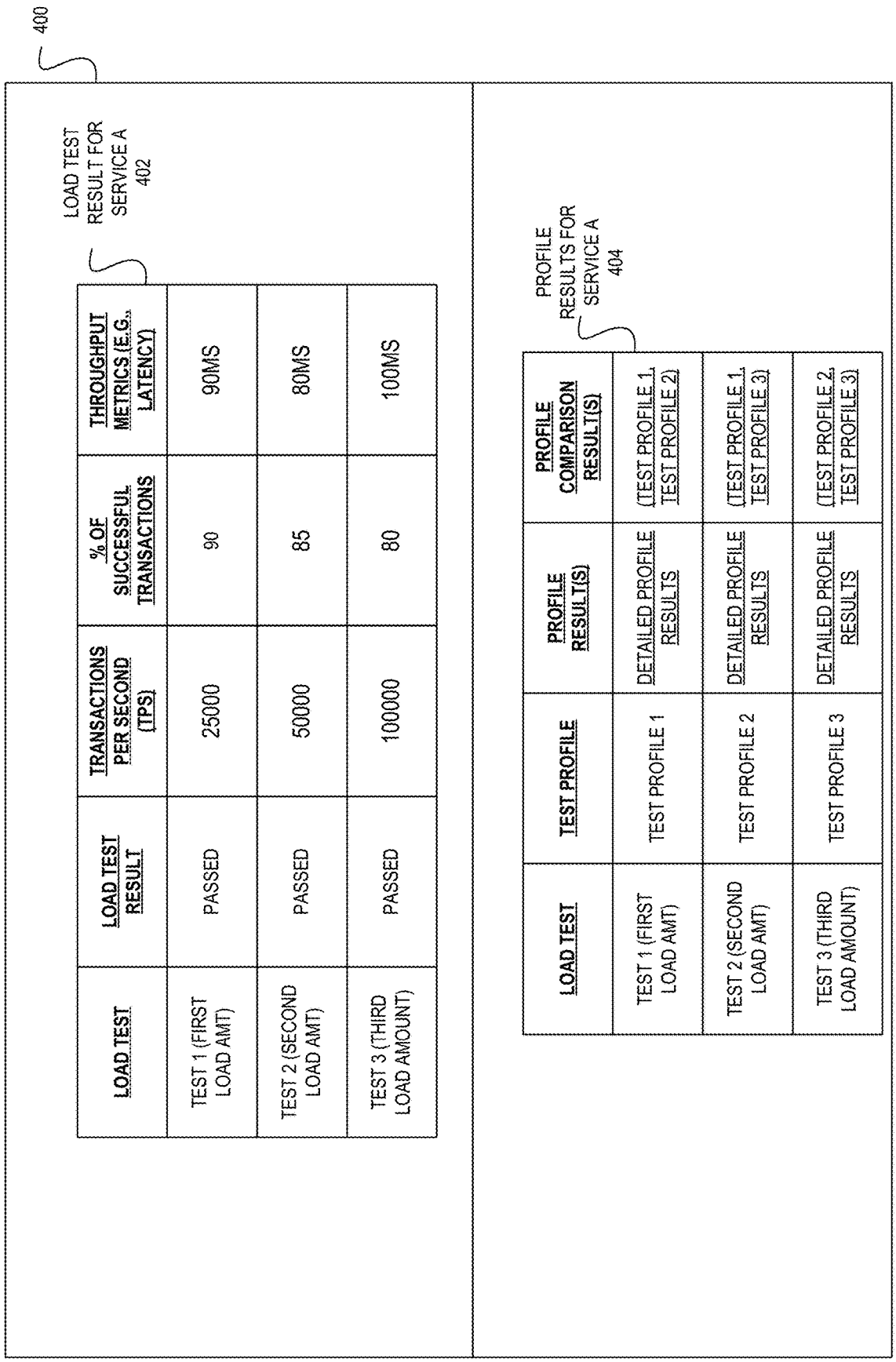
FIG. 4 is an exemplary illustration of a performance report generated by the load testing and profiling service, according to some embodiments.

FIG. 4 is an exemplary illustration of a performance report generated by the load testing and profiling service shown in FIG. 1, according to some embodiments. In certain embodiments, the performance report 400 may be generated by the load testing service 106 (shown in FIG. 1) upon receiving profile results from the profiling service 112. As discussed in relation to FIG. 1, the profile results may be generated based on analyzing profile data in test profiles associated with the service. For instance, the profile data in the test profiles may be analyzed to identify patterns that indicate performance of the one or more functions of the service when the service operates at the different load amounts. In certain embodiments, a user (e.g., 201) may view the performance report 400 via a GUI provided by a client 205 of an electronic device (e.g., 203).

The example shown illustrates an exemplary performance report 400 including both load test results and profiling information. In certain embodiments, the performance report comprises a first pane that displays a load test result 402 for a service under test (e.g., service A) and a second pane that displays profile results 404 related to the service user test (e.g., service A). As shown in FIG. 4, the load test results 402 may include a "load test" column that specifies one or more load tests (e.g., test 1, test 2, test 3, and so on) executed for the service at different load amounts (in the number of TPS), a "load test result" column that specifies criterion (e.g., passed, failed) indicative of the success/failure of the load test at a particular load amount, a "TPS" column that specifies the total number of transactions executed by the load test at the particular load amount, a "percentage of successful transactions" column that specifies the number of successful transactions processed by the service under test over a period of time for the load amount, and a "throughput metrics" column that specifies measurable resources associated with the service for the load amount such as latency, processor usage, memory usage, disk or storage usage, network usage, and the like.

The profile results 404 may include a "load test" column that specifies one or more load tests (e.g., test 1, test 2, test 3, and so on) executed for the service at different load amounts (in the number of TPS), a "test profiles" column that specifies the test profiles generated for the service at the different load amounts, a "profile result(s)" column indicative of the performance of the one or more functions of the service when the service operates at the different load amounts, and a "profile comparison result(s)" column indicative of the performance of the different test profiles generated for the service relative to each other. In certain embodiments, upon selecting a particular profile result, a user may view details pertaining to a particular profile report 502 in a third pane of the GUI as shown in FIG. 5. Similarly, upon selecting a particular profile comparison result, a user may view details pertaining to a comparison of one or more test profiles (e.g., test profile 1, test profile 2) 504 generated for the service when the service operates at different load amounts (e.g., first load amount, second load amount) in a fourth pane of the GUI as shown in FIG. 5.

It is to be understood that the performance report shown in FIG. 4 is only one representation of a performance report used to implement some embodiments, and various alternate formulations with more or fewer data columns in different orderings could alternatively be used and implemented by one of ordinary skill in the art in possession of this disclosure to implement the various embodiments described herein.

FIG. 5 is an exemplary illustration of profile results generated by the load testing and profiling service, according to some embodiments. For instance, by selecting a user interface element in performance report 400, a user may be able to view detailed profile results pertaining to a service under test. The example shown illustrates exemplary profile results 502 in a test profile 1 generated for a service A when the service operates at a first load amount. As shown, the profile results 502 may include a "lines of code" column that specifies the lines of code executed by the service, a "function(s) executed" column that specifies the function(s) executed by the service, a "duration of function calls" column that specifies the duration of the function calls, and a "memory usage" column that specifies the memory usage of the lines of code/functions executed by the service. As further shown in FIG. 5, one or more lines of code of the service may be highlighted (or underlined) to identify specific lines of code that are bottlenecking the service (e.g., service A) under test.

The example shown in FIG. 5 further illustrates details pertaining to a comparison of one or more test profiles (e.g., test profile 1, test profile 2) 504 generated for the service when the service operates at different load amounts (e.g., first load amount, second load amount). For instance, by selecting a user interface element in performance report 400, a user may be able to view detailed profile comparisons for a service under test. As shown, the profile comparisons data 504 may include a "profiles" column that specifies the profiles for the service under test (e.g., service A) that are being compared, a "function(s) executed" column that specifies the function(s) executed by the different profiles generated for the service, a "duration of function calls" column that specifies the duration of the function calls, and a "profile data pattern difference" column that identifies patterns in code and/or a core function/method executed by the service when the service operates at different load amounts. In some examples, the "profile data pattern difference" column may identify a significant difference (e.g., patterns in code) in profile data in a test profile generated based on a first/previous version of the build of the software product (service) to a test profile generated based on a second version of the build of the software product. The patterns thus identified in the profile results may be used to determine the success or failure of the load test. For instance, the patterns identified in the profile data being above a certain threshold may be used by the load testing service to determine the success or failure of the load test, in some examples, or whether to pass or fail the build of the software product (service) in other examples.

Figure 6:
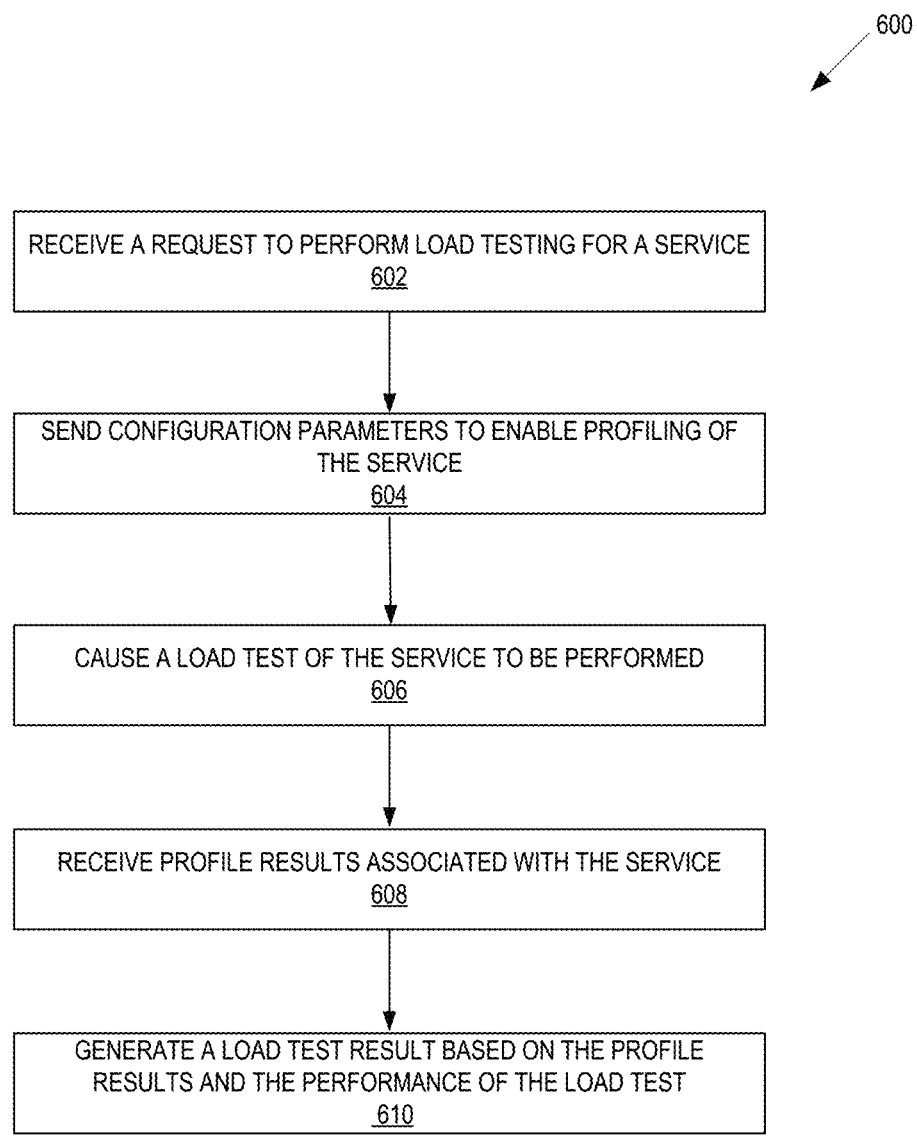
FIG. 6 is a flow diagram illustrating operations of a method for performing load testing and profiling of services according to some embodiments.

FIG. 6 is a flow diagram illustrating operations 600 of a method for performing load testing and profiling of services according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by the load testing and profiling service 102 shown in FIGS. 1-3.

The operations 600 include, at block 602, receiving a request to perform load testing for a service in a provider network. The request specifies one or more configuration parameters. As noted above, the request may be received by the load testing service 106 using any suitable interface(s) 111 from an owner and/or developer of the service. In other embodiments, the request may be sought as a step in a pipeline, e.g., for generating a build of a software product (service), deploying a software product to a test environment, or deploying a software product to a production environment.

The operations 600 further include, at block 604, sending (e.g., by the load testing service) the configuration parameters to a profiling service in the provider network to enable, verify, or configure profiling of the service. For instance, the configuration parameters may specify the service(s) and/or service identifiers of the service(s) under test, a specific endpoint or host on which the service(s) execute, a load amount (in the number of transactions per second (TPS) to be executed by the load test, time period of the load test (a running time window which specifies the start time and end time of the load test), a desired sampling interval for the load test, and so on.

In certain embodiments, the operations performed at block 604 may include, establishing (e.g., by the load testing service) a communication with the profiling service 112 to enable, verify, or configure profiling of the identified service(s) during the load test. The operations may further include receiving (e.g., from the profiling service), a message indicating that a time period of the load test is aligned with an aggregation time window for profiling the service and receiving (from the profiling service) a response indicating that profiling for the service is enabled, verified, or configured for the load test.

The operations 600 further include, at block 606, causing (e.g., by the load testing service) a load test of the service to be performed. As noted above, performing the load test may include transmitting test request data (e.g., client requests) via a load balancer 120 to one or more host(s) at the desired throughput capacity (in TPS) specified as part of the load test request.

The operations 600 further include, at block 608, receiving, from the profiling service, profile results associated with the service. The profile results may indicate performance of one or more functions of the service when the service operates at different load amounts. As discussed in relation to FIG. 1, the profiling service may analyze profile data generated by the service to identify patterns in test profiles that indicate performance of the one or more functions of the service when the service operates at the different load amounts. For instance, the analysis may include identifying, from a first test profile, a first pattern (e.g., specific lines of code)/indicating a first performance metric (e.g., lines of code where the service is spending a considerable amount of time) when the service operates at a first load amount. The analysis may further include, identifying, from a second test profile, a second pattern (e.g., functions performed by a service) indicating a second performance metric (e.g., duration of the function calls) when the service operates at a second load amount. The analysis may then include comparing the first pattern with the second pattern to determine the performance of the functions of the service at the different load amounts. In other examples, the profile results may identify a significant difference in profile data in a test profile generated from a previous version of a build of a software product (e.g., a service) to a test profile generated based on a second version of the build of the software product and provide this information to users of the provider network.

The operations 600 further include, at block 610, generating a load test result for the service. In some examples, the load test result may indicate profile results for the service and the number of successful transactions processed by the service over a period of time. The profile results may indicate the performance of the one or more functions of the service at the different load capacities. In some embodiments, patterns identified in the profile results may be used to determine the success or failure of the load test or to determine whether to halt deployment of the service or to continue with the deployment of the service in the provider network.

In certain embodiments, a method for performing load testing and profiling of services by the load testing and profiling service 102 may include simultaneously performing the profiling of services while the service operates at different load amounts to identify stress points (breaking points) in the service's performance In certain embodiments, the method may include receiving, by the load testing service 106, a request to perform a load test for a service. The request may be initiated by a user of the provider network. In certain examples, the service is implemented within the provider network and the service may be associated with the user.

In certain embodiments, the method may include causing a first load step of the load test to be performed for the service at a first load amount for a first period of time. For instance, the load testing service 106 may cause the load test of the service to be performed by transmitting, to a computing device (e.g., one or more hosts 122A-122N) executing at least a portion of the service, a first set of test request data at the first load amount for the first period of time and a second set of test request data at the second load amount for the second period of time. The method may include receiving a first profile result associated with the service for the first load step. In certain examples, the first profile result may identify a first set of one or more values of one or more performance metrics associated with one or more portions of code during the first load step. The performance metrics may represent, for instance, an amount of memory used by the portions of code, a duration of time taken to execute the portions of code, an amount of bandwidth used by the portions of code, or a number of errors or exceptions associated with the portions of code.

In certain embodiments, the method may include causing a second load step of the load test to be performed for the service at a second load amount for a second period of time. The method may include receiving a second profile result associated with the service for the second load step. In certain examples, the second profile result may identify a second set of one or more values of the performance metrics during the second load step. In certain examples, the first load amount may specify a first transaction frequency associated with performing the load test and the second load amount may specify a second transaction frequency associated with performing the load test. In certain examples, the second transaction frequency may be greater than the first transaction frequency.

In certain embodiments, the method may include determining that a breaking point threshold for the service is satisfied due to the second load step. For instance, the breaking point threshold for the service may be satisfied by identifying that a number of failed transactions associated with the service has exceeded a threshold value.

In certain embodiments, the method may include generating, by the load testing service, a load test result for the service based on the first profile result and the second profile result. In certain examples, the load test result may identify a difference between the first set of values of the performance metrics and the second set of values of the performance metrics. In certain examples, the load test result may identify one or more lines in the portions of code that caused the breaking point threshold for the service to be reached. In certain examples, the load test result may identify a first amount of memory usage used by each of the portions of code. In certain examples, the load test result may identify a first duration of time taken to execute each of the portions of code. As described above, in certain embodiments, user (e.g., 201) may view the load test results via a GUI provided by a client (e.g., 205) of an electronic device (e.g., 203).

Figure 7:
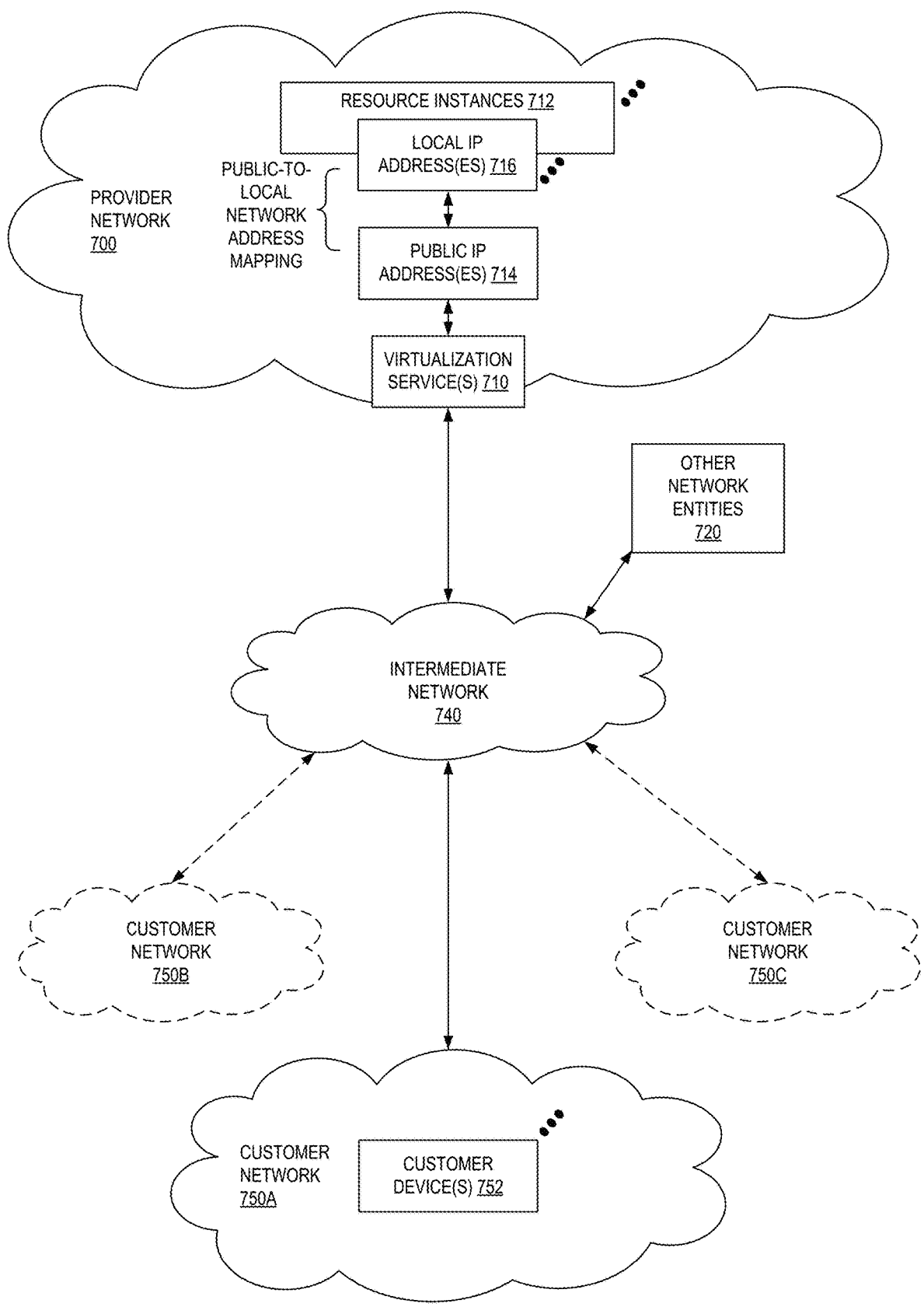
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local IP addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
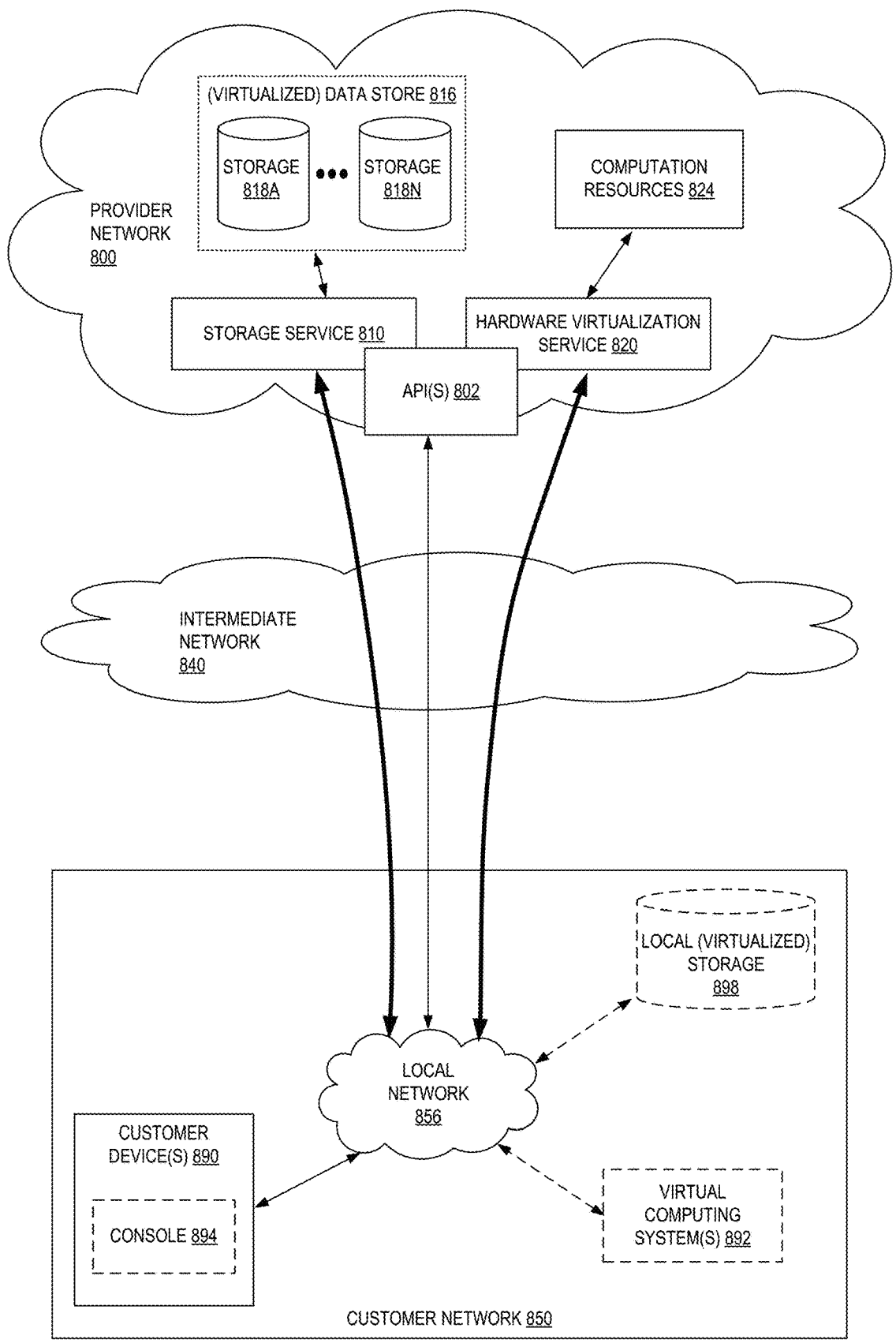
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
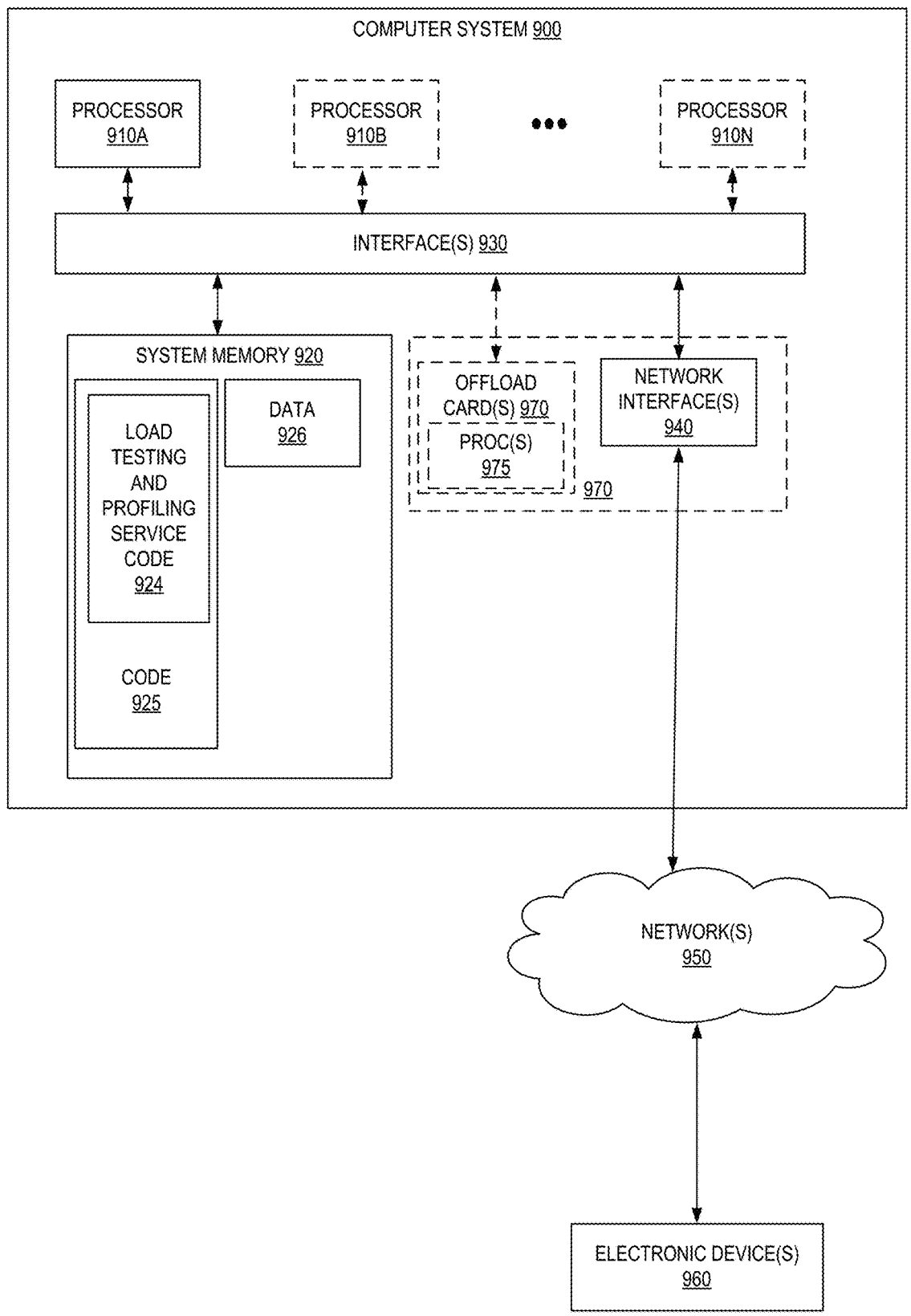
FIG. 9 is a block diagram illustrating an example computer system that may be used in some embodiments.

In some embodiments, a system that implements a portion or all of the techniques for performing load testing and profiling of services provided by a provider network as described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926. In some examples, the code 925 may include load testing and profiling service code 924 for performing the load testing and profiling of services described herein.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to perform load testing for a service in a provider network, the request specifying one or more configuration parameters, the configuration parameters comprising at least one of an identifier of the service, an endpoint identifier of a computing device that executes the service, a number of transactions per second (TPS) to be executed by the load test, a time period of the load test, or a sampling interval of the load test;
   sending the one or more configuration parameters to a profiling service in the provider network to verify or configure profiling of the service;
   causing a load test of the service to be performed by transmitting test request data to the service;
   receiving, from the profiling service, profile results associated with the service, wherein the profile results indicate performance of one or more functions of the service when the service operates at different load amounts, wherein the profile results are generated based on analyzing one or more test profiles associated with the service to identify patterns in profile data associated with the service, wherein the patterns indicate performance of the one or more functions of the service when the service operates at the different load amounts, the analyzing comprising:
     identifying, from a first test profile, a first pattern in the profile data indicating a first performance metric associated with the one or more functions of the service when the service operates at a first load amount;
     identifying, from a second test profile, a second pattern in the profile data indicating a second performance metric associated with the one or more functions of the service when the service operates at a second load amount; and
     comparing the first pattern in the first test profile with the second pattern in the second test profile to determine the performance of the one or more functions of the service at the first load amount and the second load amount; and generating a load test result based on the profile results and the performance of the load test.

2. The computer-implemented method of claim 1 further comprising:

receiving, from the profiling service, a first message indicating that a time period of the load test is aligned with an aggregation time window for profiling the service; and receiving, from the profiling service, a second message indicating that profiling for the service is enabled for the load test.

3. The computer-implemented method of claim 1, wherein causing the load test of the service to be performed comprises transmitting, to a computing device executing the service, the test request data at a first load amount specified by the request to perform load testing.

4. A computer-implemented method comprising:

receiving a request to perform load testing for a service in a provider network, the request specifying one or more configuration parameters;

sending the one or more configuration parameters to a profiling service in the provider network to verify or configure profiling of the service;

causing a load test of the service to be performed by transmitting test request data to the service;

receiving, from the profiling service, profile results associated with the service, wherein the profile results indicate performance of one or more functions of the service when the service operates at different load amounts, wherein the profile results are generated based on analyzing one or more test profiles associated with the service to identify patterns in profile data associated with the service, wherein the patterns indicate performance of the one or more functions of the service when the service operates at the different load amounts, the analyzing comprising:

identifying, from a first test profile, a first pattern in the profile data indicating a first performance metric associated with the one or more functions of the service when the service operates at a first load amount;

identifying, from a second test profile, a second pattern in the profile data indicating a second performance metric associated with the one or more functions of the service when the service operates at a second load amount; and comparing the first pattern in the first test profile with the second pattern in the second test profile to determine the performance of the one or more functions of the service at the first load amount and the second load amount; and generating a load test result based on the profile results and the performance of the load test.

5. The computer-implemented method of claim 4, wherein the one or more configuration parameters comprise at least one of an identifier of the service, an endpoint identifier of a computing device that executes the service, a number of transactions per second (TPS) to be executed by the load test, a time period of the load test, or a sampling interval of the load test.

6. The computer-implemented method of claim 4, further comprising:

receiving, from the profiling service, a first message indicating that a time period of the load test is aligned with an aggregation time window for profiling the service; and receiving, from the profiling service, a second message indicating that profiling for the service is verified or configured for the load test.

7. The computer-implemented method of claim 4, wherein causing the load test of the service to be performed comprises transmitting, to a computing device executing the service, the test request data at a first load amount specified by the request to perform load testing.

8. The computer-implemented method of claim 4, wherein the profile results are generated based on analyzing profile data generated by one or more profiling agents as a result of execution of the service.

9. The computer-implemented method of claim 4, wherein the profile results identify specific lines of code in the service associated with the performance of the one or more functions of the service when the service operates at the different load amounts.

10. The computer-implemented method of claim 9, further comprising generating a performance report for the service based on the load test result and the profile results, wherein the performance report indicates performance of the one or more functions of the service at the different load amounts and the number of successful transactions processed by the service over a period of time.

11. The computer-implemented method of claim 4, wherein the method further comprises:

determining, based on the profile results and the load test result, to deploy the service to a production environment; and causing the service to be deployed to the production environment.

12. The computer-implemented method of claim 11, further comprising:

deploying a build of the service into a test environment, wherein causing the load test of the service to be performed comprises:

testing the build of the service in the test environment, and determining to pass the build or fail the build based on the load test result.

13. A system comprising:

a first one or more electronic devices of a provider network to implement a profiling service; and a second one or more electronic devices of the provider network to implement a load testing service, the load testing service including instructions that upon execution cause the load testing service to:

receive a request to perform load testing for a service in the provider network, the request specifying one or more configuration parameters;

send the one or more configuration parameters to the profiling service to verify or configure profiling of the service;

cause a load test of the service to be performed by transmitting test request data to the service;

receive, from the profiling service, profile results associated with the service, wherein the profile results indicate performance of one or more functions of the service when the service operates at different load amounts, wherein the profile results are generated based on analyzing one or more test profiles associated with the service to identify patterns in profile data associated with the service, wherein the patterns indicate performance of the one or more functions of the service when the service operates at the different load amounts, the analyzing comprising:

identifying, from a first test profile, a first pattern in the profile data indicating a first performance metric associated with the one or more functions of the service when the service operates at a first load amount;

identifying, from a second test profile, a second pattern in the profile data indicating a second performance metric associated with the one or more functions of the service when the service operates at a second load amount; and comparing the first pattern in the first test profile with the second pattern in the second test profile to determine the performance of the one or more functions of the service at the first load amount and the second load amount; and generate a load test result based on the profile results and the performance of the load test.

14. The system of claim 13, wherein the one or more configuration parameters comprise at least one of an identifier of the service, an endpoint identifier of a computing device that executes the service, a number of transactions per second (TPS) to be executed by the load test, a time period of the load test, or a sampling interval of the load test.

15. The system of claim 13, wherein the instructions upon execution further cause the load testing service to:

receive, from the profiling service, a first message indicating that a time period of the load test is aligned with an aggregation time window for profiling the service; and receive, from the profiling service, a second message indicating that profiling for the service is verified or configured for the load test.

16. The system of claim 13, wherein the instructions upon execution further cause the load testing service to transmit, to a computing device executing the service, the test request data at a first load amount specified by the request to perform load testing.

17. The system of claim 13, wherein the profile results are generated based on analyzing profile data generated by one or more profiling agents as a result of execution of the service.

18. The system of claim 13, wherein the profile results identify specific lines of code in the service associated with the performance of the one or more functions of the service when the service operates at the different load amounts.

19. The system of claim 13, wherein the instructions upon execution further cause the load testing service to generate a performance report for the service based on the load test result and the profile results, wherein the performance report indicates performance of the one or more functions of the service at the different load amounts and the number of successful transactions processed by the service over a period of time.

20. The system of claim 13, further comprising a pipeline service, wherein the pipeline service is to:

determine, based on the profile results and the load test result, to deploy the service to a production environment or to a test environment; and cause the service to be deployed to the production environment or to the test environment.

\* \* \* \* \*